US009526399B2

(12) United States Patent
Garnett et al.

(10) Patent No.: US 9,526,399 B2
(45) Date of Patent: Dec. 27, 2016

(54) ROLLER ASSEMBLY FOR AN APPLIANCE

(75) Inventors: William Nathan Garnett, Ekron, KY (US); Daniel J. Hart, Louisville, KY (US); Aaron Matthew McDaniel, Louisville, KY (US); Craig Barclay Curtis, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1226 days.

(21) Appl. No.: 13/470,410

(22) Filed: May 14, 2012

(65) Prior Publication Data
US 2013/0300270 A1  Nov. 14, 2013

(51) Int. Cl.
*A47L 15/50* (2006.01)
*F16C 29/04* (2006.01)

(52) U.S. Cl.
CPC ............ *A47L 15/507* (2013.01); *F16C 29/045* (2013.01)

(58) Field of Classification Search
CPC .... A47L 15/507; A47L 15/504; A47L 15/503; A47L 15/505; A47B 2210/0059
USPC .......... 134/56 D, 201, 135, 137, 57 D, 58 D, 165,134/200; 211/41.8, 41.9, 151, 41.4, 162; 312/228.1, 311, 351, 312, 334.4, 228, 350
See application file for complete search history.

(56) References Cited

U.S. PATENT DOCUMENTS

| | | | | |
|---|---|---|---|---|
| 4,402,556 A | * | 9/1983 | Schwind | F16C 13/006 384/281 |
| 5,730,301 A | * | 3/1998 | Welch | A47L 15/507 211/41.1 |
| 6,571,965 B1 | * | 6/2003 | Beck | A47L 15/503 211/41.8 |
| 7,231,929 B2 | | 6/2007 | Landsiedel et al. | |
| 2004/0165803 A1 | * | 8/2004 | Barbiero | B60B 27/00 384/544 |
| 2009/0151758 A1 | | 6/2009 | Kristensson et al. | |

FOREIGN PATENT DOCUMENTS

EP        2366324        9/2011

* cited by examiner

*Primary Examiner* — David Cormier
*Assistant Examiner* — Thomas Bucci
(74) *Attorney, Agent, or Firm* — Dority & Manning, P.A.

(57) ABSTRACT

A roller assembly for an appliance such as e.g., a rack assembly of a dishwashing appliance is provided. The roller assembly is connected to e.g., the rack of the appliance. The roller assembly includes a roller that is carried upon a primary axle into which a secondary axle is received. One or more such rollers can be used with each roller assembly. The construction can provide improved strength over conventional designs such as e.g., where the roller is directly connected to a wire member. Certain embodiments can also provide aesthetic benefits in that the rollers can be partially or completely hidden depending upon the viewing angle.

7 Claims, 11 Drawing Sheets

ROLLER ASSEMBLY FOR AN APPLIANCE

FIELD OF THE INVENTION

The present invention relates to roller assembly for an appliance such as e.g., a rack assembly of a dishwashing appliance.

BACKGROUND OF THE INVENTION

A common design for a dishwashing appliance includes one or more dishwashing rack assemblies that are movable in and out of a wash chamber. One or more articles (such as dishes, cooking utensils, cups, glasses, etc.) can be placed on the racks for positioning near spray assemblies in the wash chamber that provide sprays of fluid for washing and rinsing. Using features such as e.g., tines, the racks allow a user to organize the articles while also orienting the articles in a manner intended to facilitate the removal of food soils from the surfaces of the articles. Movement of the rack assembly in and out of the wash chamber allows the user more convenient access for the loading and unloading of articles.

Both an upper and lower rack assembly may be provided. Commonly, the lower rack assembly may be provided with wheels that are carried directly on wire members attached to, or forming part of, the rack assembly. The wire is intended to serve as an axle about which the wheel rotates. This approach can present several problems.

For example, the wire member onto which the rack is mounted can be easily damaged. If the wire member is bent, the rack may not move properly in and out of the wash chamber. As such, special handling is required during manufacture. If the problem occurs or is not discovered until after a user has taken delivery, the expense of a service call may be incurred.

Additionally, depending upon e.g., the amount of weight placed into the rack by the user, the wire member may flex or bend in a manner that adversely affects the ability of the wheel to roll properly. Again, this may prevent the rack from moving properly in and out of the wash chamber. The wheel may not be oriented properly and/or may slide rather than roll—all of which can undesirably require more force to move the rack in and out.

Furthermore, from an aesthetic perspective, certain consumers may find the appearance of the wheel and its wire axle unattractive and/or non-robust. The wheels are typically visible from the top and sides of the rack. The wire axle, wheel, or both, may appear structurally weak to certain consumers.

Accordingly, in view of problems including those set forth above, a more robust wheel or roller assembly for an appliance would be useful. More particularly a wheel or roller assembly that is not readily bent and/or does not use a rod or wire member as a wheel axle would be beneficial. Such an assembly that can have improved strength for supporting the weight of a loaded rack assembly would be useful. A wheel or roller assembly that can also provide improved aesthetics would be advantageous.

BRIEF DESCRIPTION OF THE INVENTION

The present invention provides a roller assembly for an appliance such as e.g., a rack assembly of a dishwashing appliance. The roller assembly is connected to e.g., the rack of the appliance. The roller assembly includes a roller that is carried upon a primary axle into which a second axle is received. One or more such rollers can be used with each roller assembly. The construction can provide improved strength over conventional designs such as e.g., where the roller is directly connected to a wire member. Other features can also be used to further enhance the strength of the roller assembly. Certain embodiments can also provide aesthetic benefits in that the rollers can be partially or completely hidden depending upon the viewing angle. Additional aspects and advantages of the invention will be set forth in part in the following description, or may be obvious from the description, or may be learned through practice of the invention.

In one exemplary embodiment of the present invention, a roller assembly for an appliance is provided. The roller assembly includes a carrier with at least one primary axle projecting from the carrier. The primary axle defines a cylindrically-shaped outer surface portion and an opening. A cover is attached to the carrier. At least one secondary axle projects from the cover and is positioned into the opening of the primary axle. A roller defines a radial direction and defines an axial direction about which the roller is rotatable. The roller is received onto the cylindrically-shaped outer surface portion of the primary axle and is rotatable about the primary axle. At least one attachment mechanism is defined by the carrier and the cover and is configured to connect the roller assembly to the appliance.

In another exemplary embodiment, the present invention provides a dishwasher appliance. The appliance includes a cabinet having a wash chamber. A rack assembly is received into the wash chamber. The rack assembly includes a bottom wall. The rack assembly is constructed from a plurality of elongated members extending along lateral, vertical, and transverse directions and configured for receipt of articles for washing. A plurality of roller assemblies are attached to the bottom wall of the rack assembly. Each roller assembly includes a plurality of primary axles. Each of the primary axles has a cylindrically-shaped outer surface portion and an opening. A plurality of secondary axles are provided with one each received into each one of the openings of the primary axles. A plurality of rollers are carried upon the outer surface portions of the primary axles.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

In the figures, the same or similar reference numerals indicate the same or similar features.

DETAILED DESCRIPTION OF THE INVENTION

Figure 1:
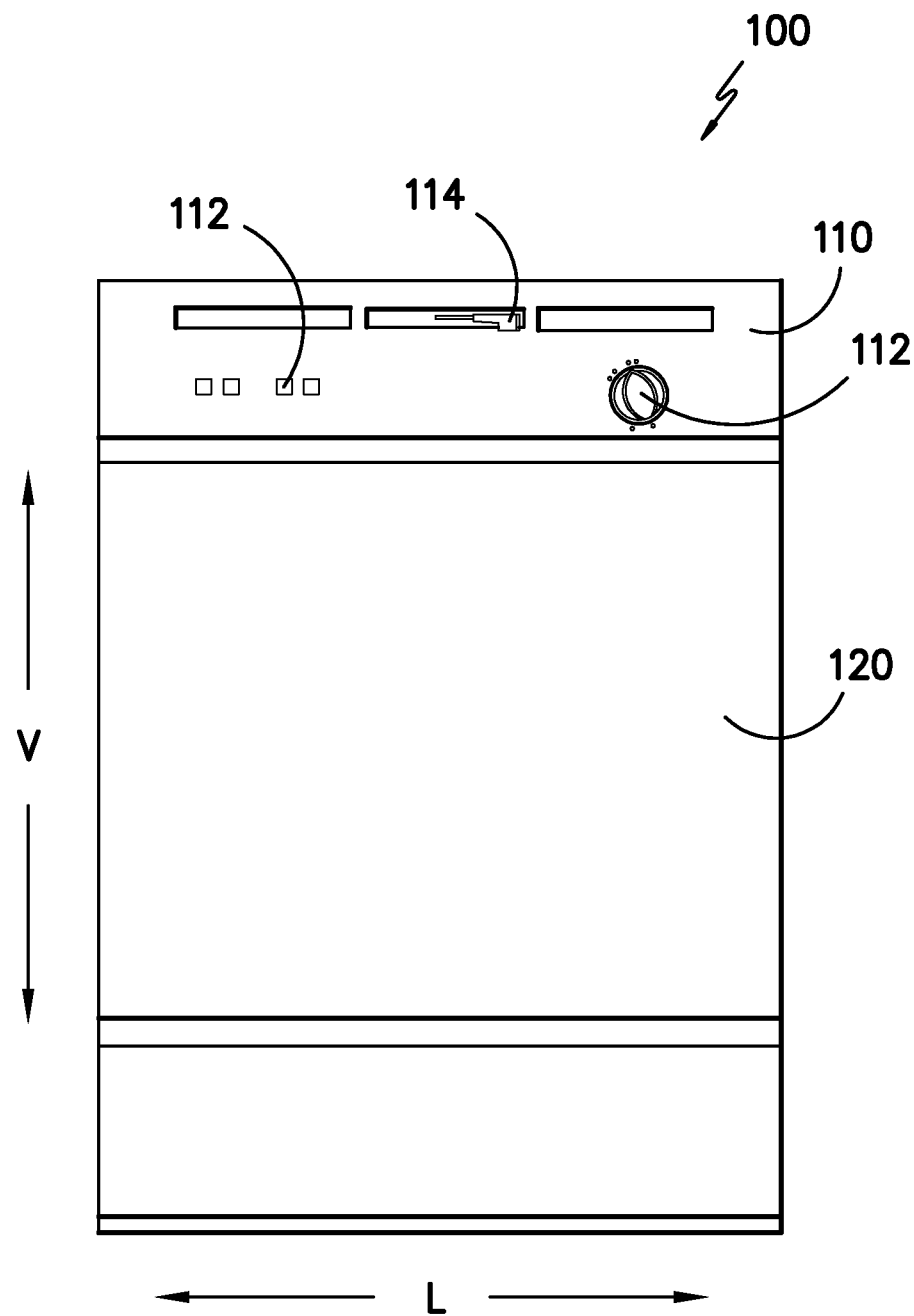
FIG. 1 provides a front view of an exemplary embodiment of a dishwasher of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
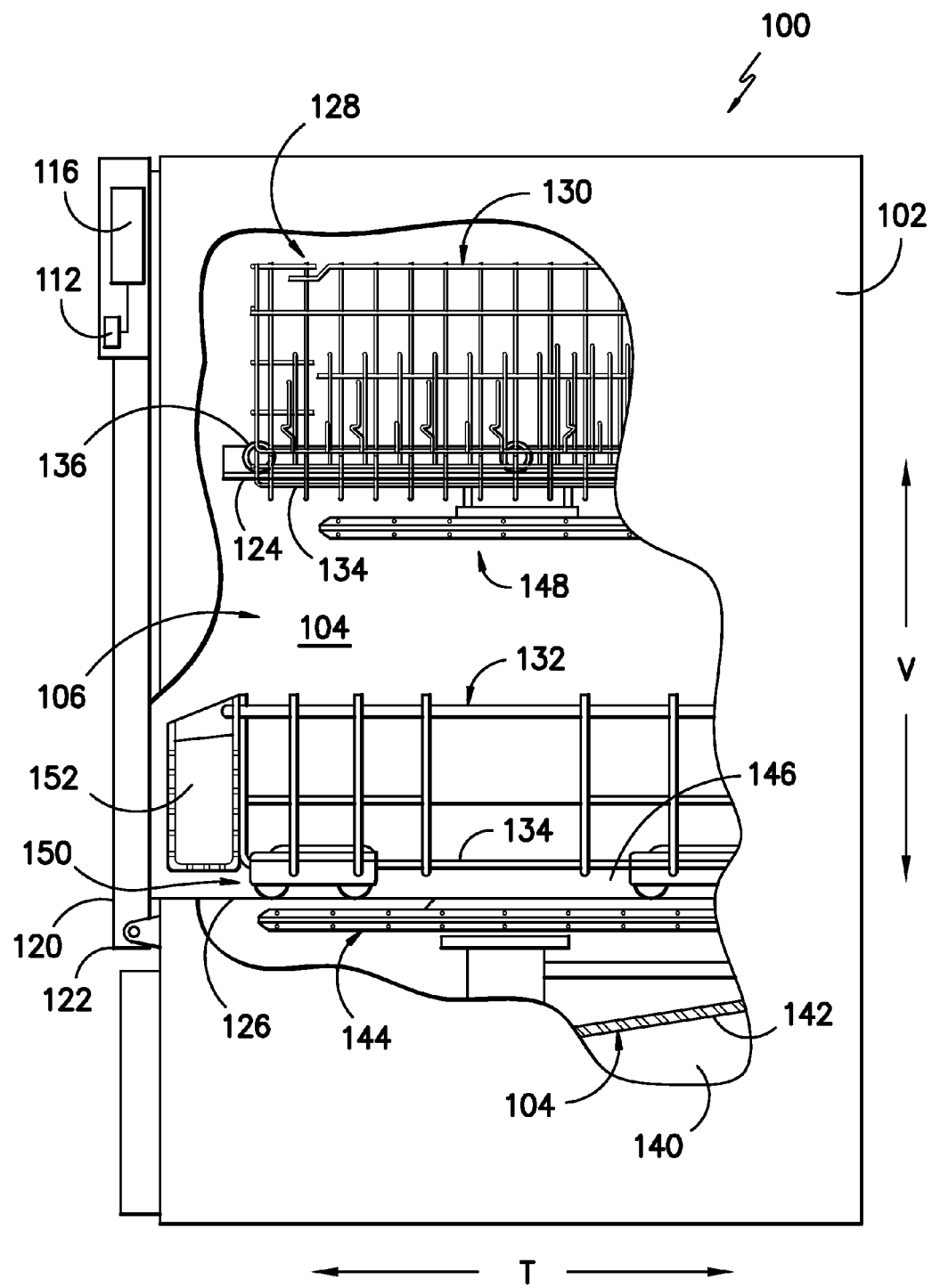
FIG. 2 provides a partial, cross-sectional side view of the exemplary embodiment of FIG. 1.

FIGS. 1 and 2 depict an exemplary domestic dishwasher 100 that may be configured in accordance with aspects of the present disclosure. For the particular embodiment of FIG. 1, the dishwasher 100 includes a cabinet 102 (or chassis) having a tub 104 therein that defines a wash chamber 106. The tub 104 includes a front opening (not shown) and a door 120 hinged at its bottom 122 for movement between a normally closed vertical position (shown in FIGS. 1 and 2), wherein the wash chamber 106 is sealed shut for washing operation, and a horizontal open position for loading and unloading of articles from the dishwasher. Latch 114 is used to lock and unlock door 120 for access to chamber 106.

Upper guide rails 124 are mounted on opposing tub side walls 128 to support and provide for movement for upper rack 130. Lower guides 126 are all positioned in opposing manner of the sides of chamber 106 and provide a ridge or shelf for roller assemblies 150 so as to support and provide for movement of lower rack 132. Each of the upper and lower racks 130, 132 is fabricated into lattice structures including a plurality of elongated members 134. Each rack 130, 132 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by wheels 136 and rollers 156 of roller assemblies 150, for example, that carry racks 130 and 132, respectively. A silverware basket 152 may be removably attached to the lower rack 132 for placement of silverware, small utensils, and the like, that are too small to be accommodated by the upper and lower racks 130, 132.

The dishwasher 100 further includes a lower spray-arm assembly 144 that is rotatably mounted within a lower region 146 of the wash chamber 106 and above a tub sump portion 142 so as to rotate in relatively close proximity to the lower rack 132. A mid-level spray-arm assembly 148 is located in an upper region of the wash chamber 106 and may be located in close proximity to upper rack 130. Additionally, an upper spray or spray arm assembly (not shown) may be located above the upper rack 130.

The lower and mid-level spray-arm assemblies 144, 148 and the upper spray assembly are fed by a fluid circulation assembly for circulating water and dishwasher fluid in the tub 104. Portions of the fluid circulation assembly may be located in a machinery compartment 140 located below the bottom sump portion 142 of the tub 104, as generally recognized in the art. Each spray-arm assembly includes an arrangement of discharge ports or orifices for directing washing liquid onto dishes or other articles located in the upper and lower racks 130, 132, respectively. The arrangement of the discharge ports in at least the lower spray-arm assembly 144 provides a rotational force by virtue of washing fluid flowing through the discharge ports. The resultant rotation of the lower spray-arm assembly 144 provides coverage of dishes and other dishwasher contents with a washing spray.

The dishwasher 100 is further equipped with a controller 116 to regulate operation of the dishwasher 100. Controller 116 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

Controller 116 may be positioned in a variety of locations throughout dishwasher 100. In the illustrated embodiment, controller 116 may be located within a control panel area 110 of door 120 as shown. In such an embodiment, input/output ("I/O") signals may be routed between the control system and various operational components of dishwasher 100 along wiring harnesses that may be routed through the bottom 122 of door 120. Typically, the controller 116 includes a user interface panel 112 through which a user may select various operational features and modes and monitor progress of the dishwasher 100. In one embodiment, the user interface panel 112 may represent a general purpose I/O ("GPIO") device or functional block. In one embodiment, the user interface panel 112 may include input components, such as one or more of a variety of electrical, mechanical or electro-mechanical input devices including rotary dials, push buttons, and touch pads. The user interface 112 may include a display component, such as a digital or analog display device designed to provide operational feedback to a user. The user interface 112 may be in communication with the controller 116 via one or more signal lines or shared communication busses.

It should be appreciated that the invention is not limited to any particular style, model, or configuration of dishwasher. The exemplary embodiment depicted in FIGS. 1 and 2 is for illustrative purposes only. For example, different locations may be provided for a user interface 112, different configurations may be provided for racks 130, 132, and other differences may be applied as well.

Figure 3:
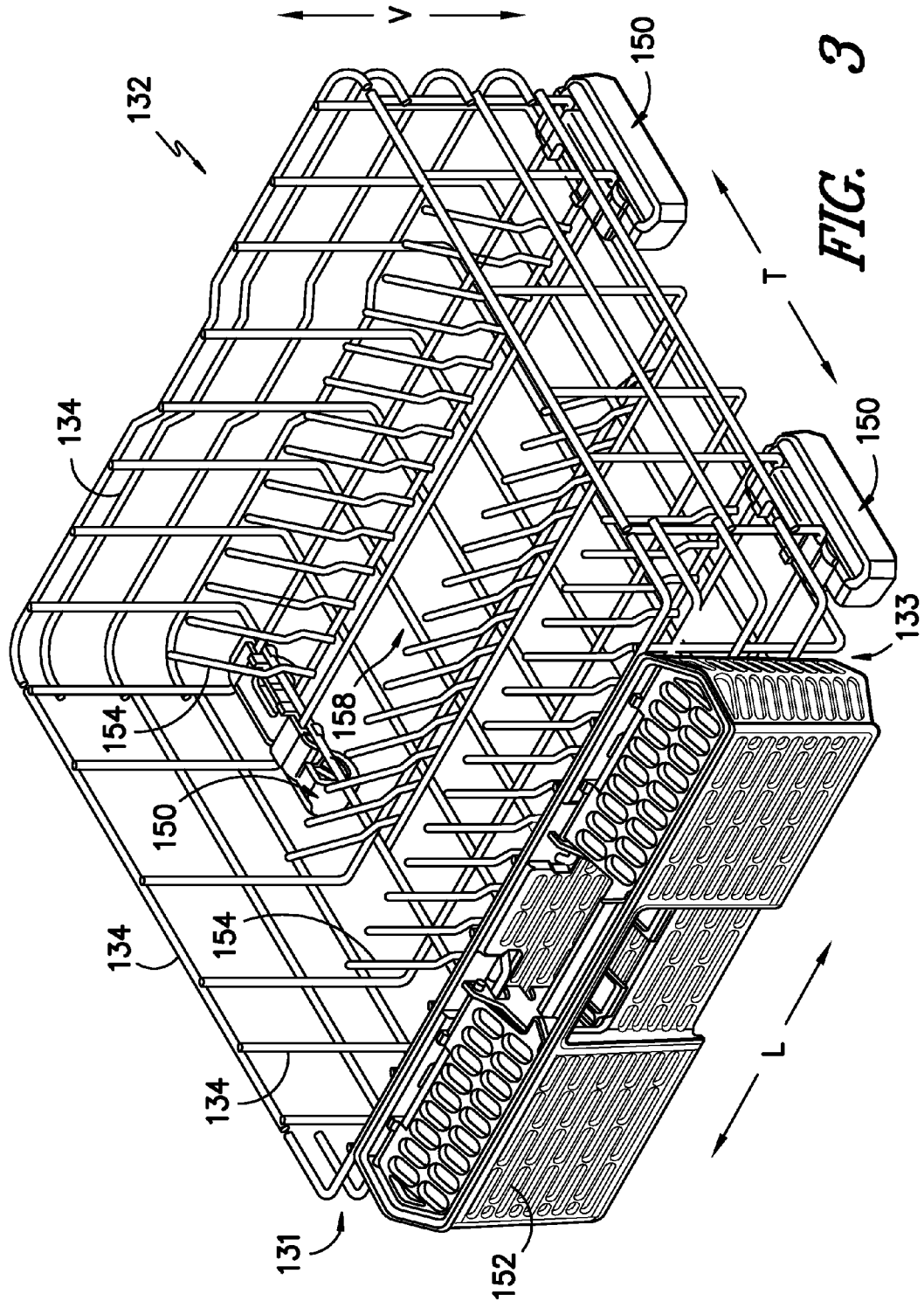
FIG. 3 is a perspective view of an exemplary rack assembly of the present invention including exemplary roller assemblies.

FIG. 3 provides a perspective view of an exemplary embodiment of a lower rack assembly 132 of the present invention. Rack assembly 132 is constructed from a plurality of elongated members 134. By way of example, elongated members 134 may be constructed from rods or wires welded together and to which a coating may be applied for protection. The elongated members 134 extend along lateral direction L, transverse direction T, and vertical direction V. The members 134 extending along the lateral and transverse directions create a bottom wall 158 of lower rack assembly 132. A plurality of tines 154 extend vertically from bottom wall 158 to provide support for various articles that can be placed in rack assembly 132 for cleaning.

As shown, rack assembly 132 includes a plurality of roller assemblies 150 attached to bottom wall 158. For this embodiment, four roller assemblies 150 (one is not visible in FIG. 3) are used near each of the four corners of rack assembly 132. The roller assemblies 150 are each oriented to allow for movement of rack assembly 132 along transverse direction T in and out of wash chamber 106 (FIG. 2).

Figure 4:
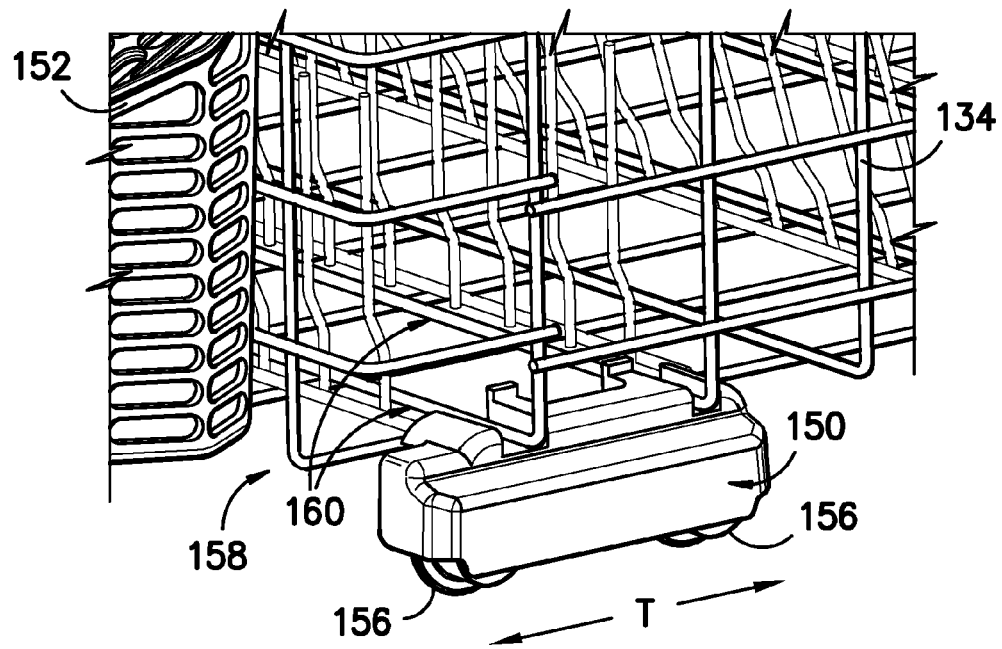
FIG. 4 is close-up, perspective view of an exemplary embodiment of roller assembly as attached to the exemplary rack assembly in FIG. 3. A portion of the attachment mechanism for connecting the roller assembly to the rack has been removed for purposes of illustration.
Figure 5:
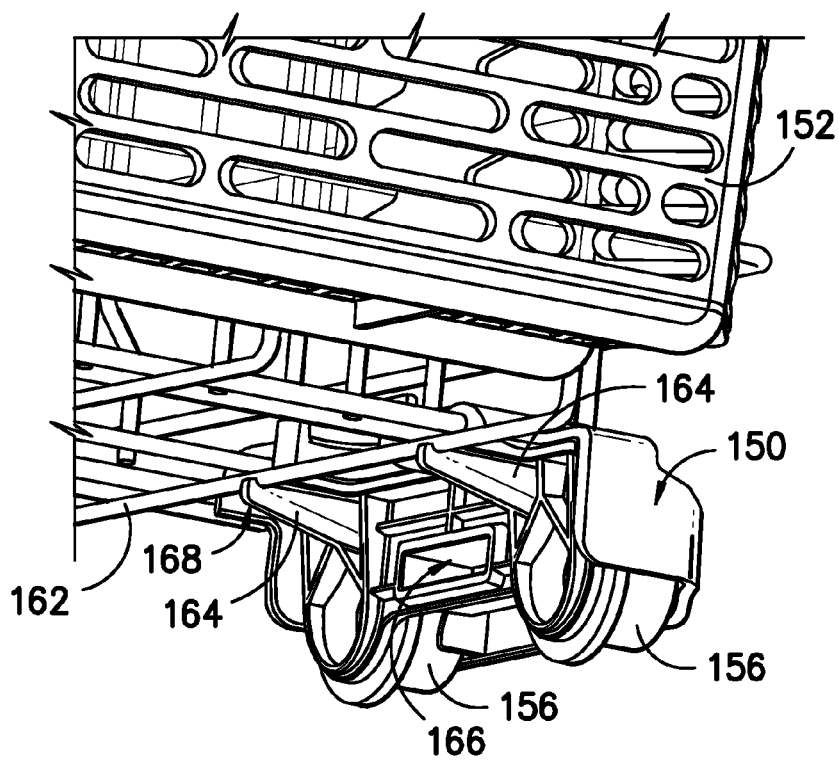
FIG. 5 is another close up, perspective view of the exemplary roller assembly of FIG. 3 as viewed from a different side than shown in FIG. 4.

FIGS. 4 and 5 provide close up, perspective views of roller assembly 150 attached to rack assembly 132. In FIG. 4, portions of the attachment mechanism (i.e. the tapered fingers 194 and 202 as more fully described later with FIG. 6) are removed to reveal the positioning of lateral extending, elongated wire members 160 into tapered grooves 196 and 204 (FIG. 6) of roller assembly 150. As will be described more fully, wire members 160 are trapped within grooves 196 and 204 to attach roller assembly 150 to rack assembly 132. In addition, a pair of support arms 164 longitudinally from roller assembly 150 along the lateral direction L (which is the same as the axial direction defined by the axis of rotation of rollers 156). Each support arm 164 includes a support arm hook 168 that is configured for receipt of an elongated member 162 extending along the transverse direction T of the appliance 100. As such, support arms 164 help attach roller assembly 150 to rack 134 and also help prevent twisting of roller assembly 150 relative to rack 132.

Figure 6:
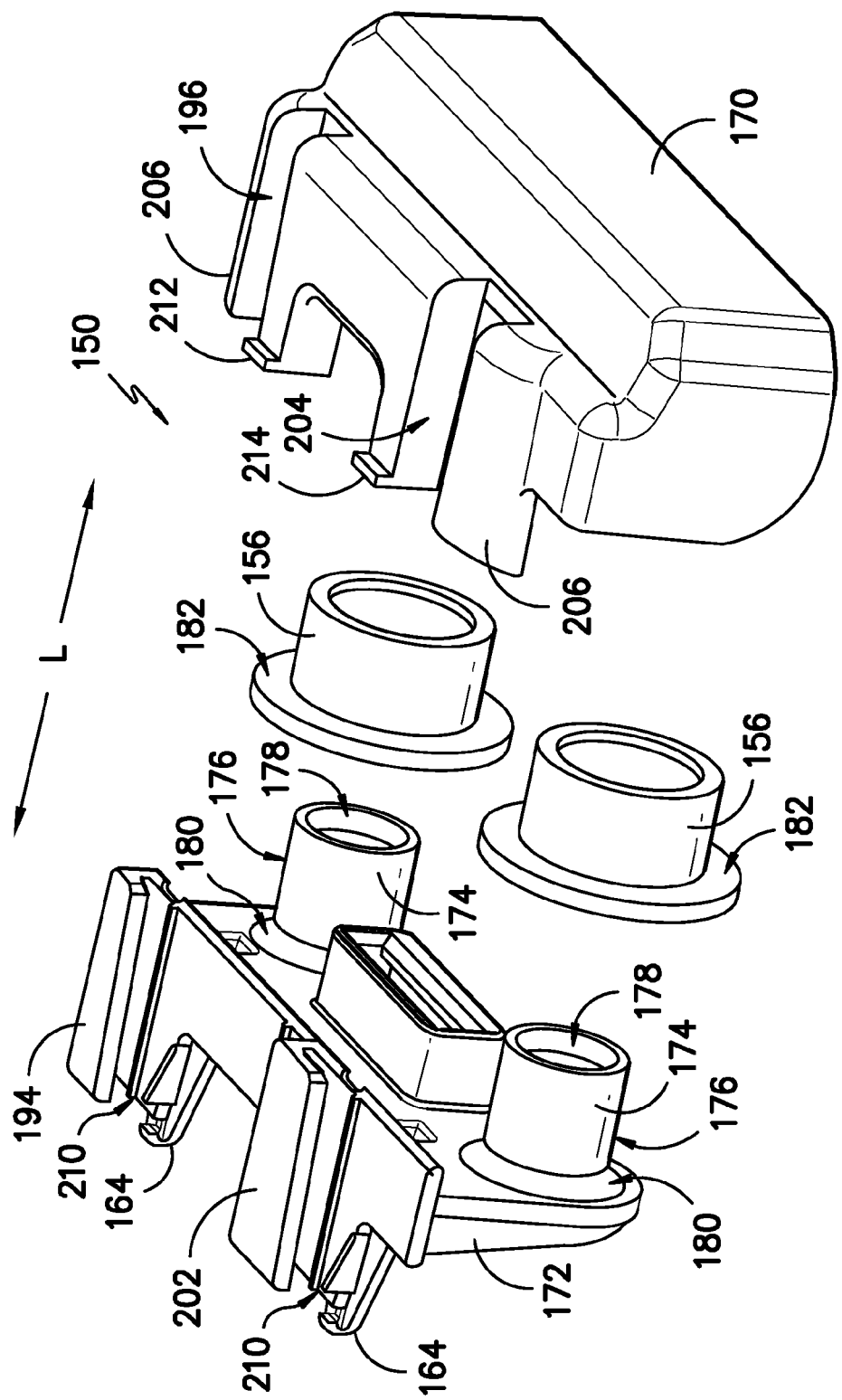
FIG. 6 is an exploded view of the exemplary roller assembly shown in FIG. 3.
Figure 7:
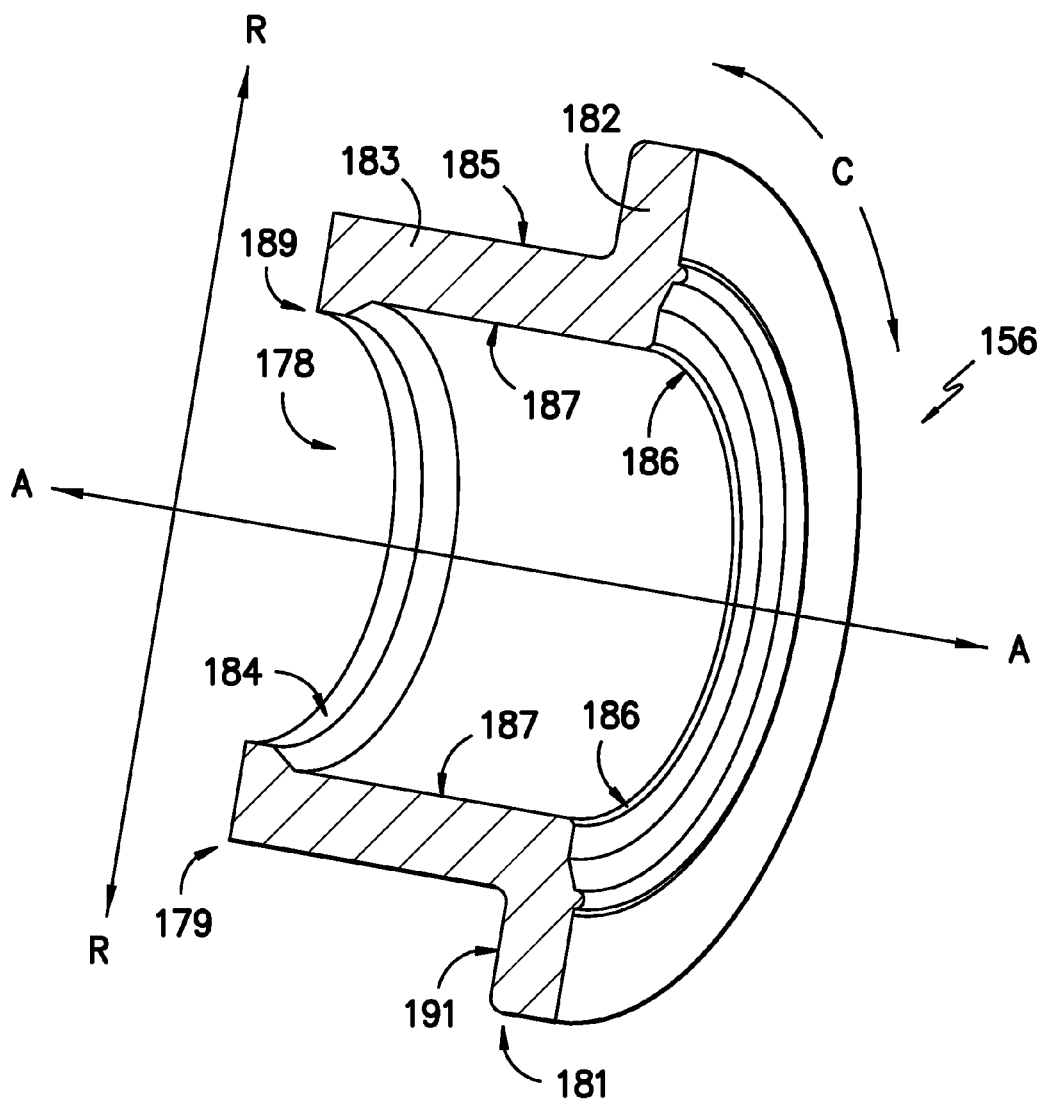
FIG. 7 is a cross-sectional view of an exemplary embodiment of a roller as used in the exemplary roller assembly of FIG. 3.
Figure 9:
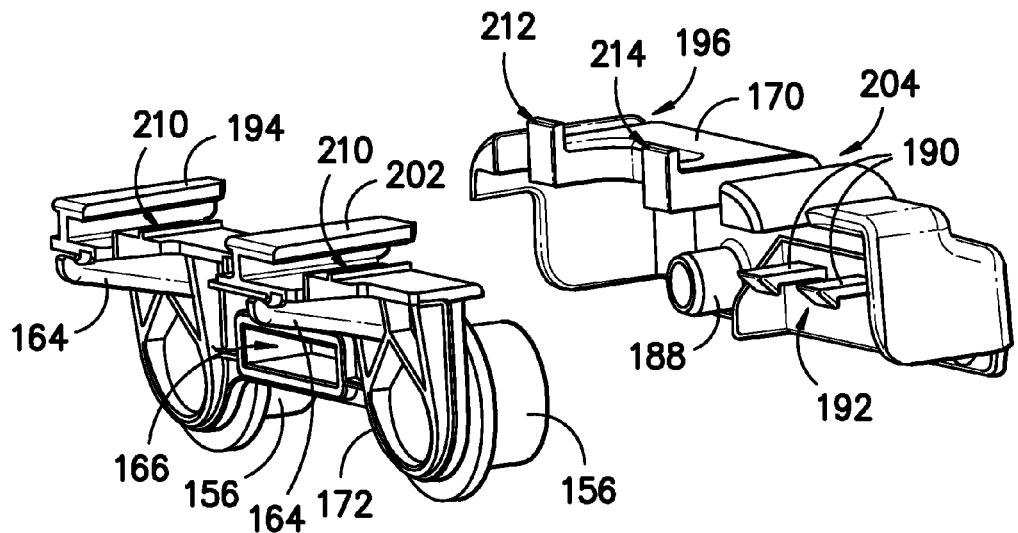
FIG. 9 is another exploded view of the exemplary roller assembly of FIG. 3.
Figure 11:
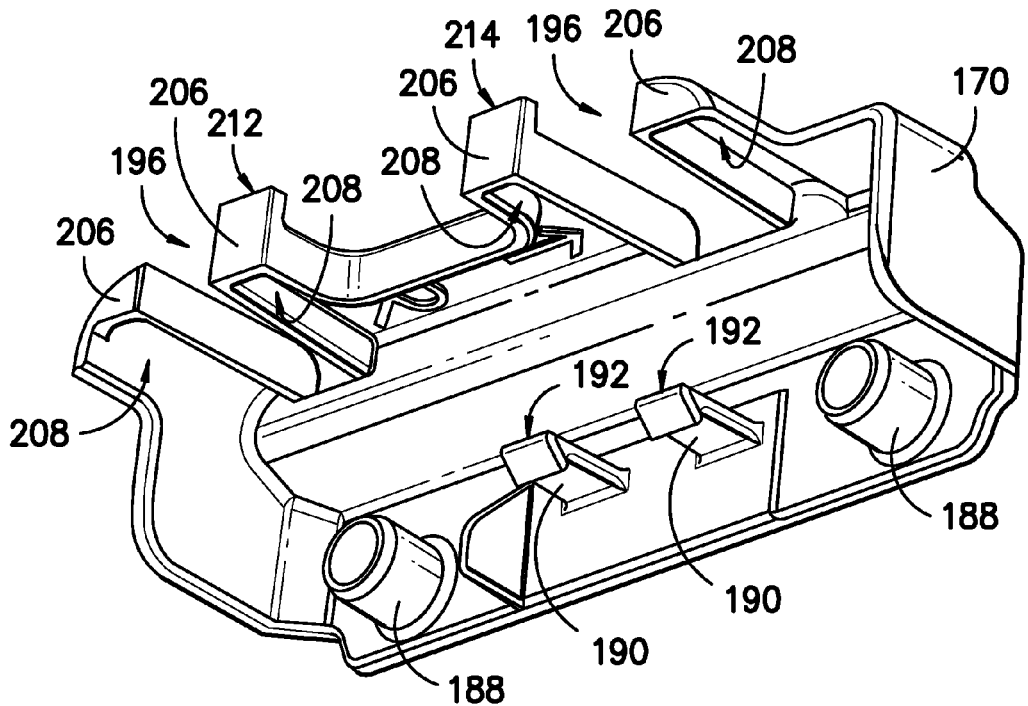
FIG. 11 is a perspective view of the bottom of an exemplary cover as used in the exemplary embodiment of a roller assembly shown in FIG. 3.

FIGS. 6 and 9 provide exploded views of roller assembly 150 while FIG. 11 provides a perspective view of the a cover 170 of assembly 150. As shown, roller assembly 150 is constructed from a carrier 172 attached to cover 170 with a pair of rollers 156 positioned therebetween. For this exemplary embodiment, two primary axles 174 project from carrier 172 along lateral direction L, which is parallel to the axial direction or axis of rotation A of rollers 156 (FIG. 7). Two secondary axles project from the cover 170. Each secondary axle is positioned into an opening 178 formed by a primary axle 174. Primary axles 174 each define a cylindrically-shaped outer surface portion 176 onto which a respective roller 156 is slidably received. Each roller 156 is rotatable about its primary axle 174.

Figure 8:
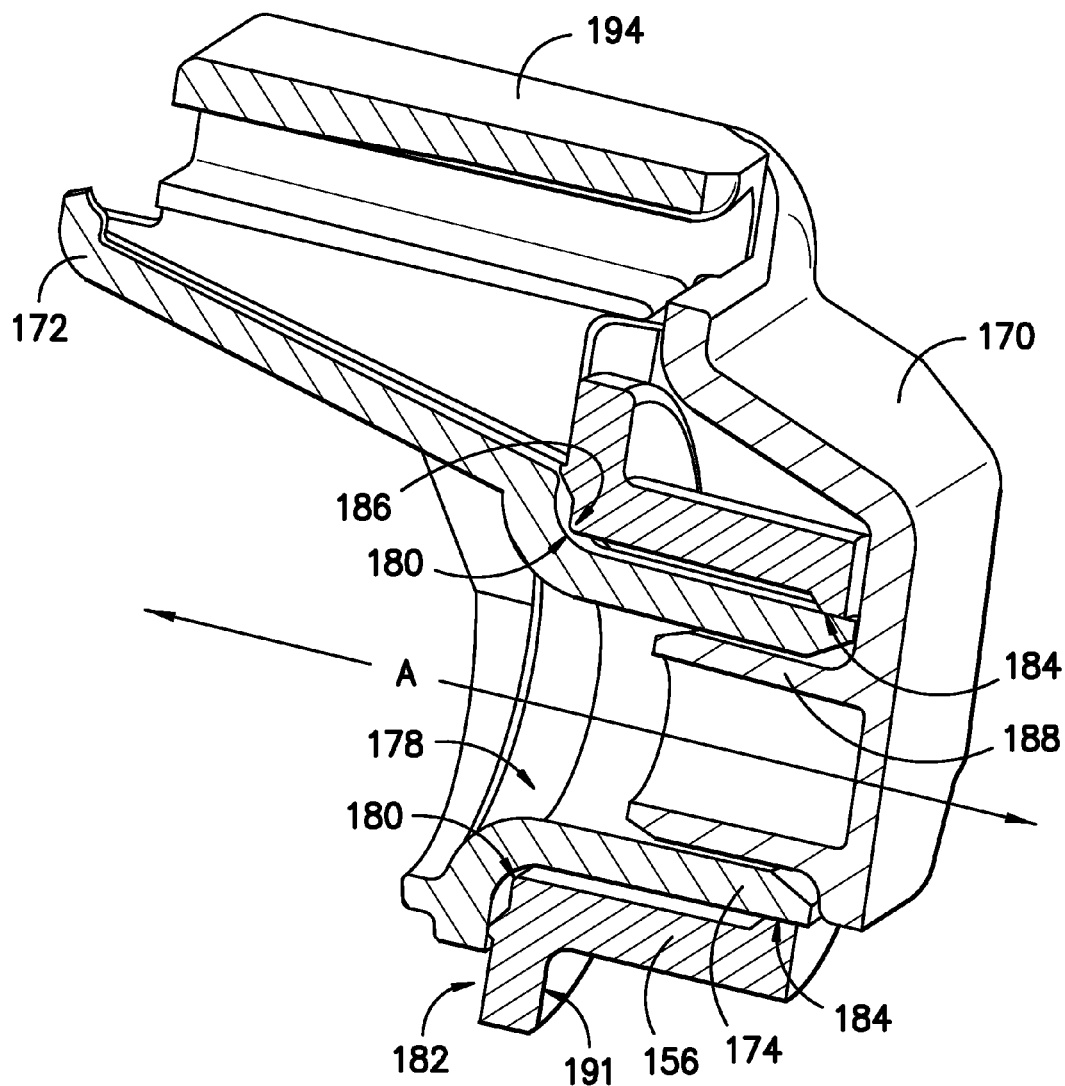
FIG. 8 is a cross-sectional view of an exemplary embodiment of a roller as used in the roller assembly shown in FIG. 3. For this exemplary embodiment, the roller is shown in place on a primary axle into which a secondary axle has been received.

Turning now to the cross-sectional view of FIGS. 7 and 8, roller 156 includes a bore 178 into which the primary and secondary axles 174 and 188 are received in a complementary manner. Bore 178 extends along the axial direction A between a first side 179 and a second side 181 of roller 156. Each axle 174 and 188 can be slightly chamfered along the axial direction A to facilitate manufacturing of assembly 150.

Roller 156 includes a cylindrical portion 183 having an exterior surface 185 and an interior surface 187 that defines bore 178. A first roller contact surface 184 is positioned along first side 179 of roller 156 on an inwardly projecting rim 189 of cylindrical portion 183. As such, first roller contact surface 184 is positioned radially inward of interior surface 187 so that it is closer to the axis of rotation (located at arrows A-A) of roller 156. A second roller contact surface 186 is positioned at the second side 181 of roller 156. Second roller contact surface 186 has a frustoconical shape that faces outwardly from bore 178 along axial direction A.

As shown in FIG. 8, first roller contact surface 184 is in sliding contact with the cylindrically-shaped outer surface portion 176 of primary axle 174. Second roller contact surface 186 is in slidable contact with an arcuate-shaped outer surface portion 180 of primary axle 174. As shown, the arcuate-shaped outer surface portion 180 is positioned between carrier 172 and primary axle 174. By controlling the size and location of contact surfaces 184 and 186, the friction associate with the rotation of roller 156 about primary axle 174 can be controlled as to improve the ease with which rack assembly 132 is moved in and out of chamber 106.

Figure 14:
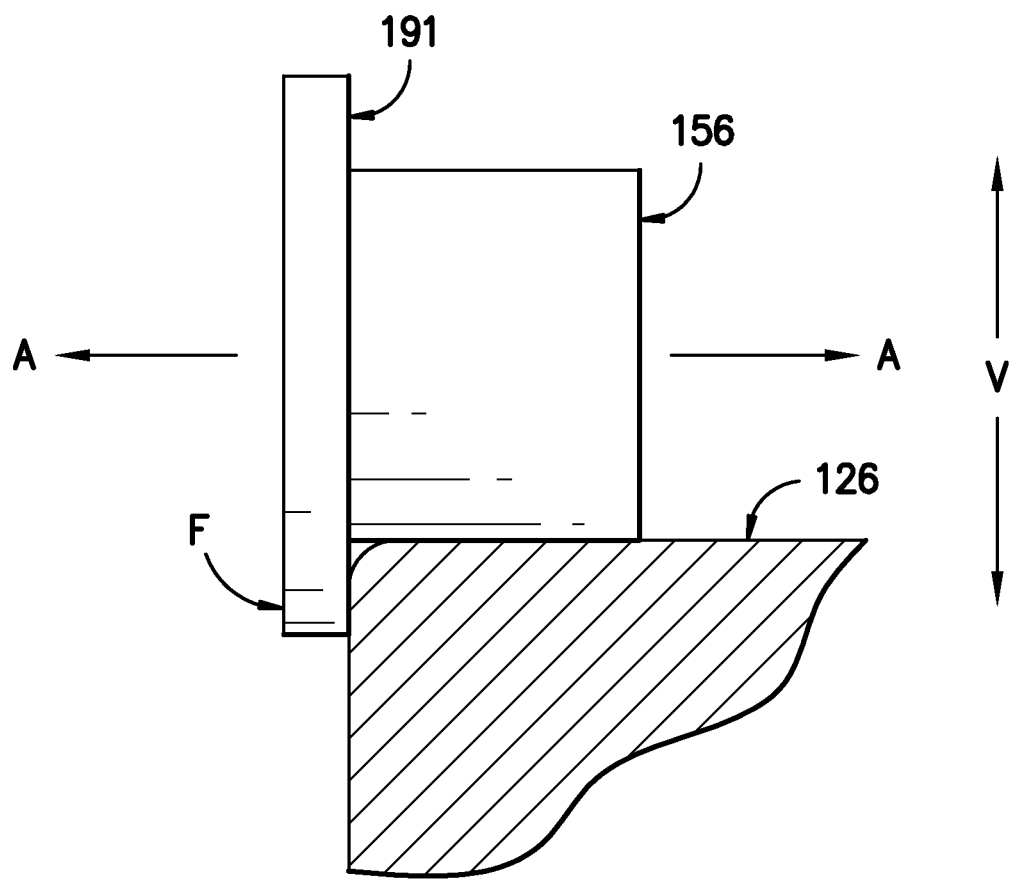
FIG. 14 provides an elevation view of an exemplary roller of the present invention as positioned in a guide in e.g., a wash chamber of an appliance.

Each roller 156 also includes a flange portion 182 that extends along circumferential direction C and projects outwardly along radial direction R. Flange portion 182 provides a third roller contact surface 191 that can be used to help secure the movement of rack assembly 132 in and out of wash chamber 106. For example, referring to FIG. 14, guides 126 can be positioned in an opposing manner on each side of chamber 106 adjacent to the lateral sides 131 and 133 (FIG. 3) of rack assembly 132. As shown for side 133 in FIG. 14, rollers 156 is received onto a guide 126 and rolls along lateral direction T (FIG. 3) to move in and out of chamber 106.

Loading of rack assembly 132 creates a torsional force F that pushes roller contact surface 191 towards guide 126. However, because the position of guide 126 is fixed, force F is resisted and undesirable rotation of roller 156 is prevented. Thus, flange portion 182 with third roller contact surface 191 can thereby improve the structural integrity or stiffness of rack assembly 132 while also ensuring the rollers 156 remain properly oriented during movement along transverse direction T. Door 120 can also be provided with a guide similar to guide 126 on both lateral sides 131 and 133 so that rack assembly 132 can be guided onto door 120 when pulled out of wash chamber 106.

Figure 10:
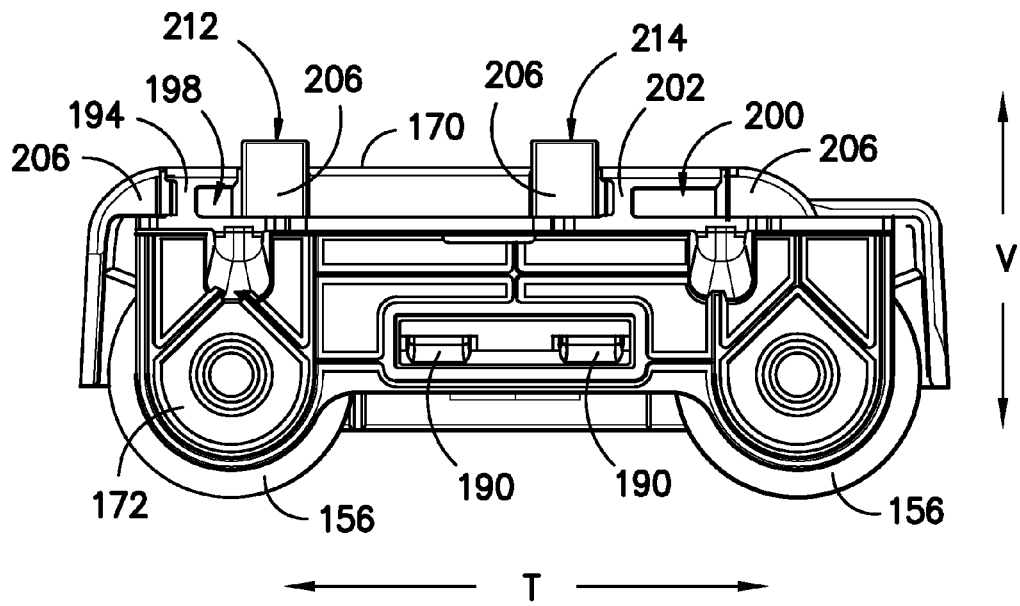
FIG. 10 is a side view of the exemplary roller assembly of FIG. 3.
Figure 12:
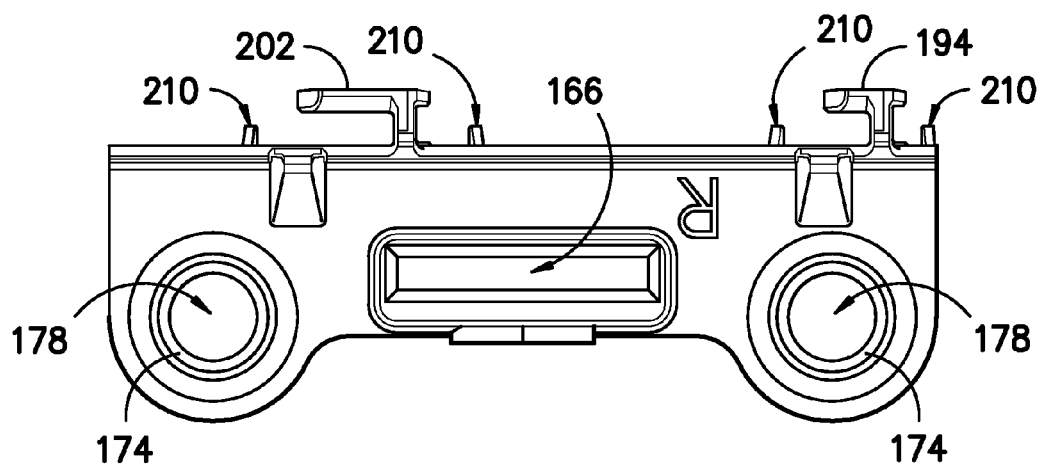
FIG. 12 is a side view of an exemplary carrier as used in the exemplary embodiment of a roller assembly shown in FIG. 3. The side shown receives the exemplary cover shown in FIG. 11.
Figure 13:
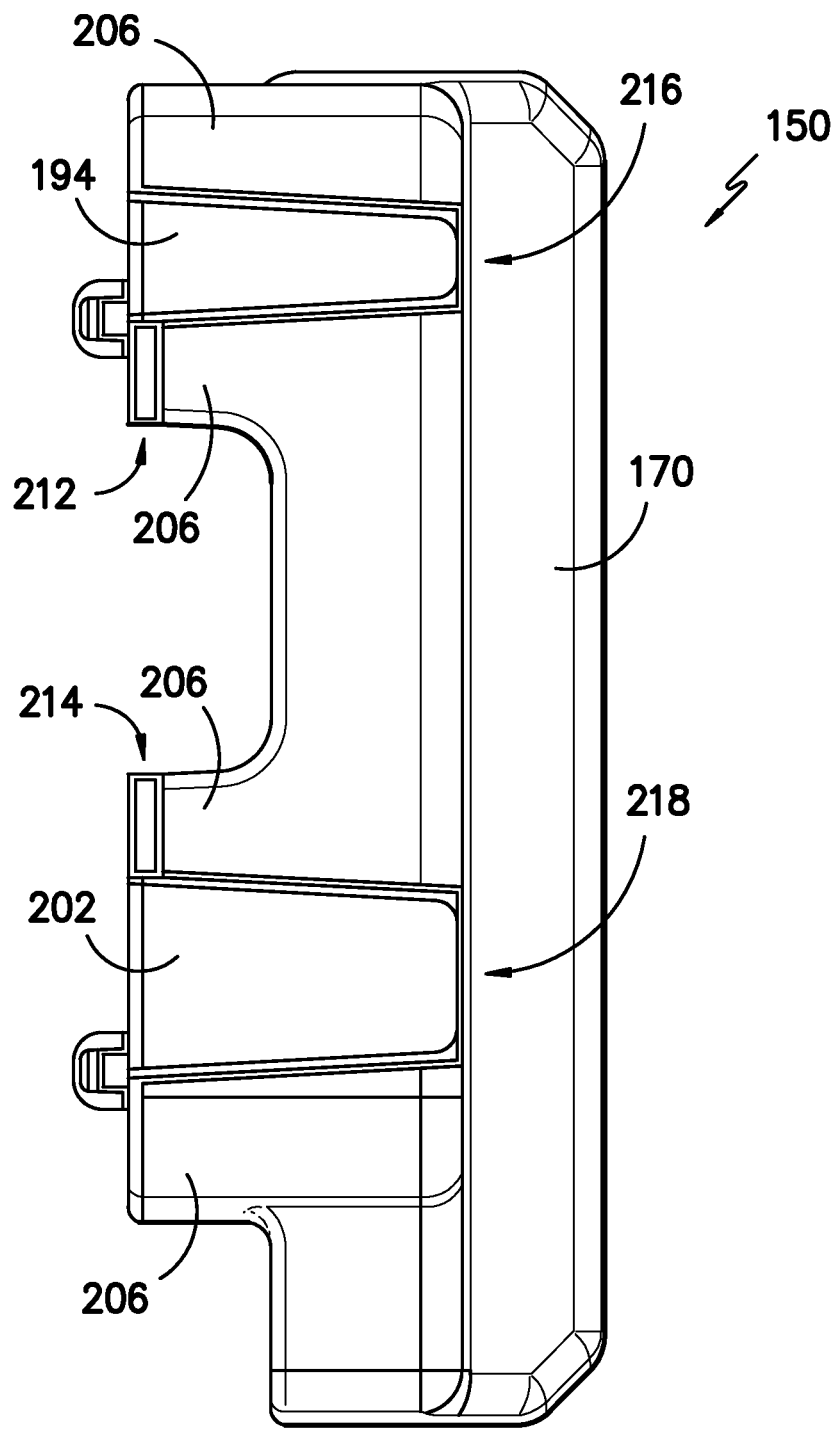
FIG. 13 is a top view of the exemplary roller assembly of FIG. 3.

As shown in the top view provided by FIG. 13, roller assembly 150 includes attachment mechanisms 216 and 218 for attachment to rack assembly 132. Referring now to FIG. 6 and FIGS. 9-12, attachment mechanism 216 is constructed from a first tapered finger 194 that is received in a complementary manner into a first tapered groove 196. First tapered finger 194 projects from carrier 172 while first tapered groove 196 is defined by cover 170. Additionally, first tapered finger 194 forms an L-shape (FIG. 12). Together, as best seen in FIG. 10, first tapered finger 194 and groove 196 extend along axial direction A to define a first channel 198 that receives and traps an elongated member 160 of rack assembly 132 (FIG. 4).

Continuing with FIG. 6 and FIGS. 9-12, attachment mechanism 218 is constructed from a second tapered finger 202 that is received in a complementary manner into a second tapered groove 204. Second tapered finger 202 projects from carrier 172 while second tapered groove 204 is defined by cover 170. Additionally, second tapered finger 202 forms an L-shape (FIG. 12). Together, as best seen in FIG. 10, second tapered finger 202 and second tapered groove 204 extend along axial direction A to define a second channel 200 that also receives and traps another elongated member 160 of rack assembly 132 (FIG. 4).

As shown, second channel 200 is wider along transverse direction T than first channel 198. This difference in width allows roller assembly 150 to readily accommodate rack assemblies having different spacings along transverse direction T between the elongated members 160.

Roller assembly 150 is also provided with several features for the secure attachment of cover 170 to carrier 172. As shown in FIGS. 9-12, a pair of attachment arms 190 extend from cover 170 along lateral direction L and into a slot 166 defined by carrier 172. Each attachment arm 190 includes a prong 192 for securing arm 190 to carrier 172.

Additionally, referring to FIGS. 10 through 13, multiple receivers 206 project from cover 170 along lateral direction L and each having a receiver opening 208. Multiple detents 210 project along vertical direction V from carrier 172 and are ramped along axial direction A (FIGS. 6 and 9). Detents 210 are positioned on carrier 172 to align with receivers 206 on cover 170.

Accordingly, as tapered fingers 194 and 202 are moved along lateral direction L into tapered channels 198 and 200 during construction of roller assembly 150, receivers 206 eventually contact a respective detent 210. Receivers 206 are deflected along vertical direction V as they slid along the ramped detents 210. Eventually, receivers 206 slide completely over detents 210 along lateral direction L and snap into place.

A variety of materials can be used for the construction of roller assembly 150. For the exemplary embodiment shown in the figures, cover 170 is constructed from a first plastic material while carrier 172 is constructed from a second plastic material that is less flexible than the first plastic material. For example, carrier 172 can be constructed from a chemically coupled homopolymer-polypropylene, containing 30% strand glass fibers and a stabilizer to reduce long-term heat aging, which particularly enhances performance in a dishwasher environment. Cover 170 can be constructed from a non-glass reinforced polymer. As such, cover 170 can have more flexibility to facilitate e.g., the flexing of receivers 206 during construction as discussed above. By way of example, rollers 156 can be constructed from an acetal copolymer, consisting of oxymethylene and oxyethylene. Such a composition can be inherently more stable and resistant to thermal degradation during service life because the repeating copolymer units block polymer "unzipping" under thermal stress. In addition to thermal stability, the copolymer also provides enhanced property retention when exposed to higher levels of pH in alkaline detergent solutions.

Although each roller assembly 150 is shown with two rollers 156, using the teachings disclosed herein it will be understood that carriers with one, two or more rollers 156 may also be constructed in other exemplary embodiments of the present invention as well. Additionally, covers 170 and carrier 172 can have other shapes to provide different aesthetic effects.

Roller assembly 150 is also equipped with tabs 212 and 214 as shown in FIGS. 6, 9, 10, 11, and 13 that extend along vertical direction V. Tabs 212 and 214 may be used to support articles placed in rack assembly 132. For example, tabs 212 and 214 can hold the edge of a plate or baking sheet so as to properly orient the plate in rack assembly 132. Tabs 212 and 214 enable increased rack capacity without reducing wash performance. Additionally, tabs 212 and 214 still allow a silverware basket to be located above them in rack 132.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A dishwasher appliance, comprising:
a cabinet that includes a wash chamber;
a rack assembly received into the wash chamber, said rack assembly comprising a bottom wall, said rack assembly constructed from a plurality of elongated members extending along lateral, vertical, and transverse directions and configured for receipt of articles for washing;
a plurality of roller assemblies attached to the bottom wall of said rack assembly, each said roller assembly comprising:
a plurality of primary axles, each of said primary axles having a cylindrically-shaped outer surface portion and an opening;
a plurality of secondary axles, where each of said secondary axles is received within the opening of one of said primary axles;
a carrier from which at least two of said primary axles project;
a cover attached to said carrier, wherein at least two of said secondary axles project from said cover;
a first tapered groove defined by said cover;
a first tapered finger projecting from said carrier and received in a complementary manner into said first tapered groove, wherein said first tapered groove and said first tapered finger together define a first channel into which a first elongated member of the appliance is received;
a second tapered groove defined by said cover;
a second tapered finger projecting from said carrier and received in a complementary manner into said second tapered groove, wherein said second tapered groove and said second tapered finger together define a second channel into which a second elongated member of the appliance is received, and wherein said second channel has a width along the transverse direction that is greater than a corresponding width of said first channel along the transverse direction; and
a plurality of rollers, each one of said rollers carried upon the outer surface portion of one of said primary axles, wherein each said roller has a first side and a second side spaced apart along an axial direction, and wherein each said roller further comprises:
a cylindrical portion having an exterior surface and an interior surface, the interior surface defining a bore extending along the axial direction of said roller; and a first roller contact surface positioned at the first side of said roller and projecting from the interior surface of the cylindrical portion inwardly along a radial direction.

2. A dishwasher appliance as in claim 1, wherein each of said rollers comprises a flange extending circumferentially about said roller and projecting radially from an exterior surface of said roller.

3. A dishwasher appliance as in claim 1, further comprising:
   a plurality of detents projecting from said carrier;
   a plurality of receivers projecting from said cover,
   a plurality of openings defined by said plurality of receivers;
   wherein each of said detents projects into one of said receivers so as to releasably attach said cover to said carrier.

4. A dishwasher appliance as in claim 3, wherein said cover comprises a first plastic material and said carrier comprises a second plastic material, and wherein said first plastic material is more flexible than said second plastic material.

5. A dishwasher appliance as in claim 1, wherein each said roller further comprises:
   a second roller contact surface positioned at the second side of said roller and having a frustoconical shape.

6. A dishwasher appliance as in claim 1, wherein the first roller contact surface is in sliding contact with the cylindrically-shaped outer surface portion of one of said primary axles.

7. A dishwasher appliance as in claim 6, wherein each of said primary axles further comprises an arcuate-shaped outer surface portion positioned between said carrier and the cylindrically-shaped outer surface portion, wherein said second roller contact surface is in sliding contact with the arcuate-shaped outer surface portion of one of said primary axles.

\* \* \* \* \*